United States Patent [19]
Sawyer

[11] 3,896,621
[45] July 29, 1975

[54] ACTUATING UNIT
[75] Inventor: Robert H. Sawyer, Bernardsville, N.J.
[73] Assignee: Cartridge Actuated Devices, Inc., Fairfield, N.J.
[22] Filed: July 20, 1973
[21] Appl. No.: 381,321

Related U.S. Application Data
[63] Continuation-in-part of Ser. No. 230,837, March 1, 1972, Pat. No. 3,748,413.

[52] U.S. Cl. .................. 60/635; 29/432; 29/520; 85/21; 200/61.08; 151/41.73
[51] Int. Cl. ............................................ F01b 29/08
[58] Field of Search ....... 29/432, 520; 60/26.1, 635; 85/21; 151/41.73; 200/61.08

[56] References Cited
FOREIGN PATENTS OR APPLICATIONS
1,223,011  8/1966  Germany ............................ 29/432

Primary Examiner—Charlie T. Moon
Attorney, Agent, or Firm—Nolte and Nolte

[57] ABSTRACT

There is shown an actuating device comprising a piston and cylinder unit having a piston with a metal forming configuration on the side thereof from which a piston rod projects and a recess is provided in the rod adjacent the configuration. The arrangement is such that upon impact by that side of the piston from which the rod projects on an end wall of the cylinder the material of the end wall is deformed into the recess to prevent rebound of the piston. The device is also illustrated in combination with an explosive operated initiating element. The rebound prevention principle is also shown utilized in a technique for joining two workpieces in which a fastener has a metal forming configuration adapted to deform the material of one of the workpieces into which the fastener is driven, the deformed material of the workpiece being moved into a recess adjacent the deforming configuration.

1 Claim, 5 Drawing Figures

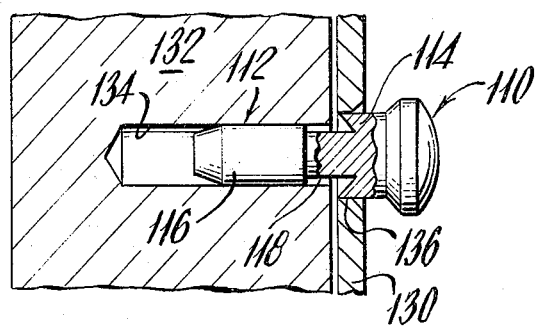
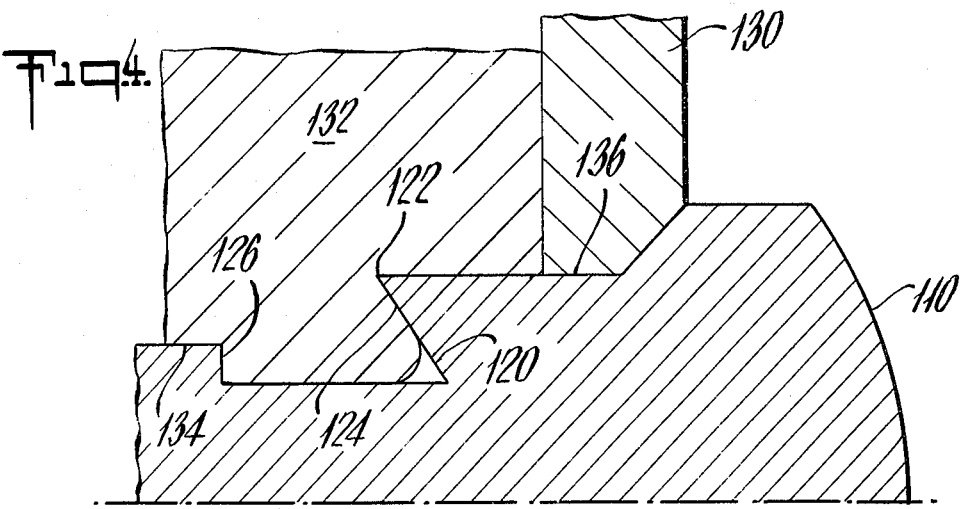
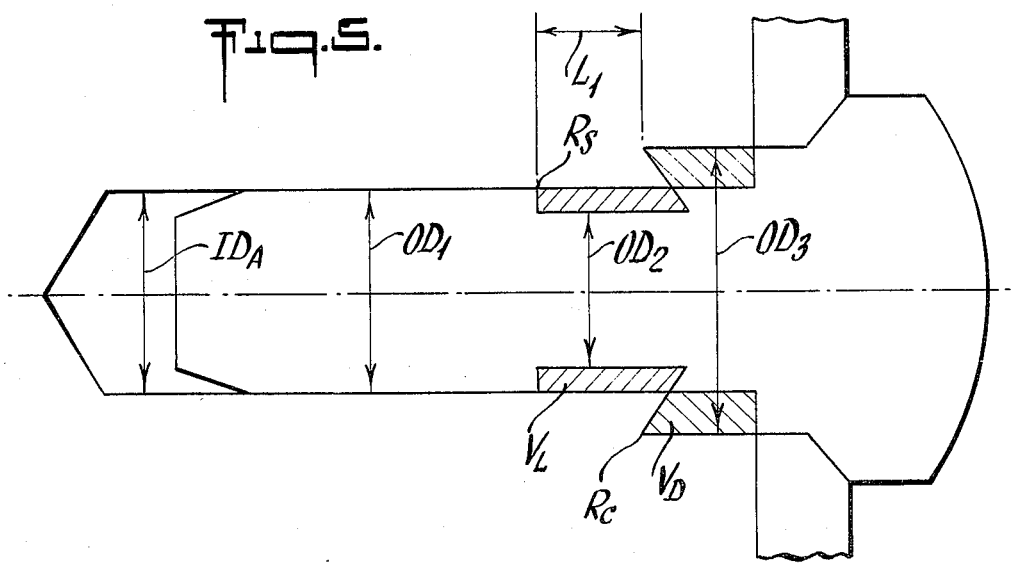

ACTUATING UNIT

This application is a continuation-in-part of application Ser. No. 230,837, filed Mar. 1, 1972 and issued as U.S. Pat. No. 3,748,413 on July 24, 1973.

This invention basically is concerned with uniting two elements.

From one aspect it is concerned with an actuating device, particularly one including a piston and cylinder element which is subject to a high motive force moving the piston from one position to another but which has a relatively small retaining force for holding the piston in the position to which it is moved. From this aspect the invention provides means for uniting the piston with the cylinder in the position to which it is moved to preclude rebound.

As far as this aspect of the invention is concerned the most pertinent art of which the applicant is aware is U.S. Pat. No. 3,234,727 issued on Feb. 15, 1966 to H. C. Filer. That patent shows an explosively actuated motor comprising a piston and cylinder unit in which matching grooves are formed in the cylinder and in the piston and a deformable element is inserted into the cylinder between an end wall of the cylinder and the piston to be deformed, upon actuation of the motor, into the matching grooves thus to prevent rebound.

The present invention provides an arrangement for preventing rebound in such a motor in which no assembly of a separate element between the end wall of the cylinder and the piston is required and which is effective to prevent rebound.

According to another aspect of this invention, there is provided a fastener for uniting the two workpieces with a head adapted to hold one workpiece to the other and a shank with a metal forming configuration adapted to be passed through a hole in one of the workpieces and into the hole of the other workpiece and to deform the material of said other workpiece to prevent retraction of the fastener and separation of the two workpieces.

So far as the applicant is aware, the most pertinent art in the second aspect of the invention is that in U.S. Pat. No. 2,358,728 issued Sept. 19, 1944 to E. A. Miller.

Embodiments of the invention are illustrated in the accompanying drawings in which:

FIG. 3 is a schematic sectional view of an assembly to be joined by the fastener according to this invention;

FIG. 4 is an enlarged detail of the assembly of FIG. 3 after completion of the fastening process; and FIG. 5 is an enlarged view of the arrangement of FIG. 3 in which the relative dimensions of certain parts of the assembly are shown.

Figure 1:
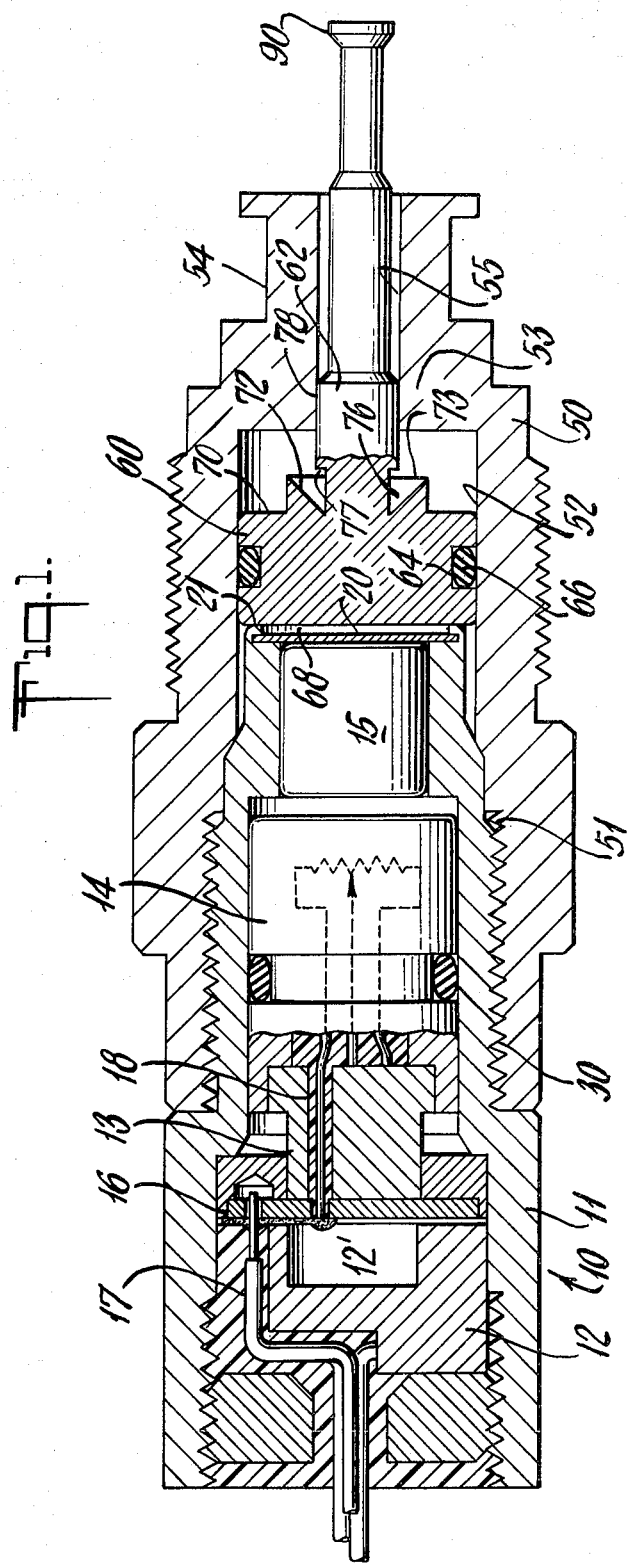
FIG. 1 is a longitudinal cross-section of the device according to the present invention.
Figure 2:
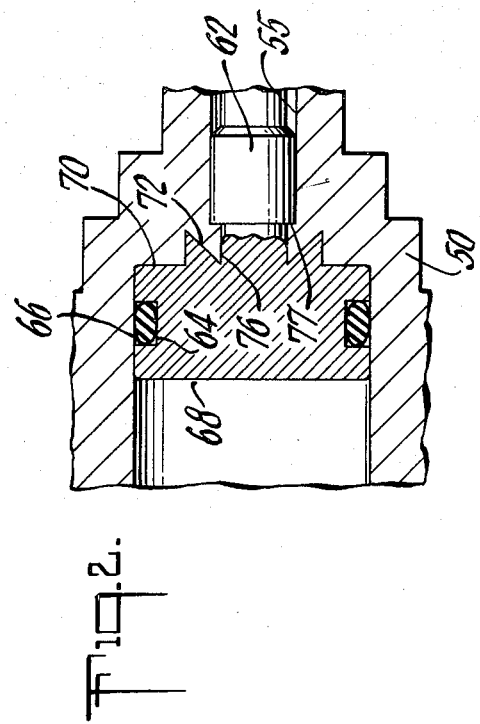
FIG. 2 is a detail of the device of FIG. 1 subsequent to actuation.

Referring now particularly to FIGS. 1 and 2, the combination illustrated comprises a circuit breaking device generally indicated at 10 and described fully in copending application Ser. No. 230,622 filed March 1, 1972 in the name of James H. McPherson issued July 10, 1973 as U.S. Pat. No. 3,745,276. That device comprises a housing 7, an anvil 12, a cutter 13, a plunger 14 and an explosive charge 15. Mounted between the anvil and cutter is a printed circuit board 16 across which a circuit is made between a conductor 17 in the anvil and a conductor 18 in the cutter. The anvil is provided with an appropriate recess 12' which receives the severed portion of the printed circuit board after the device is actuated.

It is to be noted that that portion of the device 10 containing the charge 15 is closed by a washer element 20 which is held in position by crimping over the edges 21 of the body 11. This aspect of the invention and its relationship to the combination according to this invention will be described in greater detail hereinafter.

The body 11 is externally screw threaded as at 30. By means of these external screw threads 30 a cylindrical housing 50 is secured by corresponding internal screw threads 51 to the device 10.

The housing 50 has a cylindrical internal space 52 and an end wall 53 through which, and though an extension 54 of which, there is formed a guide opening 55. Mounted for sliding movement within the cylinder 52 is a piston comprising a head 60 and a rod or stem 62.

The head has an annular recess 64 formed in its generally cylindrical surface and within that recess is an O-ring 66 which cooperates with the walls of cylindrical space 52 effectively to seal the regions of the cylinder to opposite sides of the head from each other.

The face 68 of the head constitutes a working face exposed to a motive force which in this instance will be that resulting from the expansion of gas from the explosive charge 15 disposed in an explosive charge receiving chamber 15'. The opposite face 70 of the head has a preferably annular metal deforming configuration 72. The metal deforming configuration 72 is, in this instance, of V-section defining a sharp edge 73 opposing the end wall 53 of the cylinder.

Adjacent to configuration 73 and on the piston rod 62 is an annular recess 76 which is defined in part by a shoulder 77 which faces the piston surface 70 and the radially innermost face defining the V-section metal forming configuration leads towards that recess.

The enlarged portion 78 of the piston rod coacts with the central opening 55 of the end wall of the cylinder to guide the piston in its movement.

At the end of the piston rod remote from the piston head is a configuration 90 which may be used for any actuating purpose but it will be especially useful for making or breaking a circuit (not shown) externally of the device. For example only, the configuration 90 may be formed with a contact shearing device similar to cutter 13 for cutting an external circuit or it may be formed as a bridging contact for an external circuit. In addition, the configuration 90 may be used to cut or shear diaphragms for the release of pressure or opening of one chamber into another.

It will be appreciated that upon detonation of the charge 15 the piston head will be forcefully moved to the right as viewed in FIG. 1, so that the edge 73 on the face 70 of the piston head will strike the end wall of the cylinder. The material of the head and the material of the end wall of the cylinder or the treatment of the forming configuration 72 or the shaping of the end wall of the cylinder are such that as the piston strikes the end wall of the cylinder the material of that end wall will be swaged or deformed to move into the recess 76 and, by cooperation with shoulder 77, prevent rebound of the piston from the end wall of the cylinder. The end wall of the cylinder may be of any suitable material that is swagable or deformable, such as a metallic material, while the configuration 72 is preferably of a harder material.

By carefully selecting the firmness by which the washer 20 is crimped to the end of housing 11 relatively to the resistance of the printed circuit board 16 to being sheared by cutter 13, one can arrange that either piston 61 be moved to the right before the cutter is moved to the left or that the cutter move to the left before the piston moves to the right. In this way, one can achieve a "make before break" or "break before make" action where the configuration 90 at the outer end of the piston controls a circuit.

While the cutting edge 73 of the present invention is illustrated as being annular, it is to be appreciated that it could take the form of one or more teeth and be opposed to a recess in the piston rod of similar configuration to swage only a part of the end wall of the cylinder into that recess. According to a further modification of this embodiment the end wall of the cylinder may have an upstanding portion which may be turned over upon impact by the piston edge to move into the recess 76.

Referring now to the embodiment of the invention illustrated in FIGS. 3 through 5, it will be seen that the fastener of those figures has a head 110 and a shank or rod 112. In this instance the head is of the dome type but of course it will be appreciated that it may take any form appropriate to the use to which it is put.

The shank has a swaging portion 114 adjacent head 110 and a lead portion 116 separated from the swaging portion by a neck 118. The swaging portion 114 is of a greater diameter than the lead portion and is undercut 120 to define a cutting edge 122 and a swaging face 124 which constitutes one side of the neck 118. The neck 118 is completed by a square shoulder 126 facing the cutting edge 122. The assembly to be made according to this invention is one in which a sheet 130 is to be connected to a body element 132 having a blind bore 134. It is to be noted that the diameter of the bore 134 is less than the diameter of the swaging portion 114 of the shank 112 of the fastener and of course that the hole 136 in the sheet 130 is of a diameter to allow the passage of the swaging portion.

After the assembly is completed to the stage illustrated in FIG. 3, the fastener is driven by a driving force applied to the head 110 which is sufficient to drive the swaging portion and its cutting edge 122 into the material of the body member 32 so that that material is deformed by the cutting edge and swaging face to assume a position illustrated schematically in FIG. 4.

It is to be noted that the material of the body member 32 entrapped between the shoulder face 26 and the swaging face 124 effectively precludes the separation of the rivet from the body member 132 and, since the head 110 of the fastener abuts the plate 130 so too does it prevent the separation of the plate and body members.

Reference is now made to FIG. 5 of the drawings. In that figure the fastener is shown and certain dimensions are illustrated on it. Those dimensions are identified in the following table:

$OD_1$ = Outside diameter of the lead portion of the shank.
$OD_2$ = Outside diameter of the neck portion of the shank.
$OD_3$ = Outside diameter of the swaging portion of the shank.

$V_D$ = Volume of material of the body displaced in driving
the fastener.
$V_L$ = Volume of the neck available for accomodation of
material deformed from the body element.
$ID_A$ = Internal diameter of the body element.
$L_l$ = The axial distance between the cutting edge and the
shoulder of the neck.
$R_c$ = The radius of the cutting edge.
$R_s$ = The radius of the edge at the junction of the
shoulder of the neck and the lead portion of the shank.

In a desired configuration according to this invention the following parameters may be developed:

1. Fit of shank (%)

$$\frac{OD_1 - ID_A}{OD_1} = -2 \text{ to } 2\%$$

It is desirable but not necessary to have an interference fit between the lead portion of the shank and the blind bore into which it is fitted. About 2 % of play is possible.

2. Lock shoulder step ratio $$\frac{OD_2}{OD_1} = 75 \text{ to } 85\%$$

The neck diameter is between, desirably, 75 to 85 % of the diameter of the lead portion of the shank.

3. Displacement step ratio $$\frac{OD_3}{OD_1} = 135 \text{ to } 145\%$$

The diameter of the swaging portion of the shank is greater by about 35 to 45 percent than the diameter of the lead portion of the shank.

4. Lock length ratio $$\frac{L_1}{OD_1} = 35 \text{ to } 40\%$$

5. Cutter angle, i.e. the angle included between the generatrix of the swaging portion of the shank and the cutting face 124 is between 50° and 70°.
6. Cutter radius $R_c = .010$ inches maximum To effect swaging, the edge of the cutter should not be rounded to more than a radius of 0.010 inch.

7. Displacement volume ratio $$\frac{\text{Lock Volume }(V_L)}{\text{Displacement Volume }(V_D)} = 60\% \text{ to } 100\%$$

i.e., the volume of material displaced by the fastener during driving should be sufficient to fill 60 to 100 percent of the neck volume into which that material is driven.

8. The hardness ratio of the base to the rivet should be about 85 percent maximum, in other words, the fastener should be harder than the base material.

It has been found that with the fastener according to this invention especially by forming the parameter $R_s$ less than 0.010 inches, one is able virtually to insure that the only way in which the rivets can be withdrawn from the body member is by shearing the material which is swaged into the neck region of the shank rather than as in the past and in the prior art specification mentioned above by bending it back to its original shape. This provides for a very much greater retention factor for the fastener of this invention.

What is claimed is:

1. An actuating unit comprising a piston and cylinder, the piston comprising a head slidable within the cylinder on the interior cylindrical wall thereof and a piston rod projecting from one side of the head and aligned with an opening in an end wall of the cylinder, said opening constituting a guide aperture, said piston rod extending through said aperture and being guided by marginal edges of said aperture, that side of the head remote from the rod constituting a working surface to be subject to a motive force, means for joining said units to an actuating member for producing said motive force, the head of said piston having a metal forming configuration comprising an annular knife edge on that side thereof from which the rod projects, a recess in the rod adjacent said metal forming configuration and defined, at least in part, by a shoulder facing said configuration, deformable means cooperating with said configuration and consisting only of an integral portion of said cylinder end wall, said deformable means being deformable upon impact by said metal forming configuration said configuration including an inclined face leading from the knife edge towards said recess, said interior wall of the cylinder being substantially continuous between said one side of the head and said end wall in an initial position of said head within the cylinder, whereby upon application of motive force to said piston said metal forming configuration deforms said deformable means into said recess whereby said deformable means are constituted as means preventing rebound of the piston.

* * * * *

UNITED STATES PATENT OFFICE
CERTIFICATE OF CORRECTION

Patent No. 3,896,621                Dated July 29, 1975

Inventor(s) Robert H. Sawyer

It is certified that error appears in the above-identified patent and that said Letters Patent are hereby corrected as shown below:

In the Title page:

under item [56], insert the following:

--UNITED STATES PATENTS--

| | | | |
|---|---|---|---|
| 1,919,552 | 7/1933 | Hasselquist | 29/520 |
| 1,929,824 | 10/1933 | Palley | 29/520UX-R |
| 2,358,728 | 9/1944 | Miller | 85/21 |
| 2,931,874 | 4/1960 | Leaman | 200/61.08X-R |
| 3,186,284 | 6/1965 | Bennett | 29/520UX-R |
| 3,234,727 | 2/1966 | Filer | 60/26.1 |
| 3,443,617 | 5/1969 | Whiteside et al | 29/520X-R |

FOREIGN PATENTS OR APPLICATIONS

| | | | |
|---|---|---|---|
| 270,375 | 8/1913 | Germany | 29/520-- |

Signed and Sealed this eleventh Day of November 1975

[SEAL]

Attest:

RUTH C. MASON
*Attesting Officer*

C. MARSHALL DANN
*Commissioner of Patents and Trademarks*